United States Patent
Zhang et al.

(10) Patent No.: US 8,068,694 B2
(45) Date of Patent: Nov. 29, 2011

(54) IMAGING APPARATUS, METHOD AND PROGRAM

(75) Inventors: Yitong Zhang, Kurokawa-gun (JP);
Takeshi Misawa, Kurokawa-gun (JP);
Masaya Tamaru, Kurokawa-gun (JP);
Masahiko Sugimoto, Kurokawa-gun (JP); Tomokazu Nakamura, Kurokawa-gun (JP); Makoto Oishi, Miyagi (JP)

(73) Assignee: FUJIFILM Corporation, Tokyo (JP)

( * ) Notice: Subject to any disclaimer, the term of this patent is extended or adjusted under 35 U.S.C. 154(b) by 883 days.

(21) Appl. No.: 12/101,425

(22) Filed: Apr. 11, 2008

(65) Prior Publication Data
US 2008/0253687 A1    Oct. 16, 2008

(30) Foreign Application Priority Data

Apr. 13, 2007 (JP) .................................. 2007-106316

(51) Int. Cl.
*G06K 9/36* (2006.01)
(52) U.S. Cl. ........................................ 382/284
(58) Field of Classification Search .................. 348/565, 348/584; 352/62; 382/268, 284
See application file for complete search history.

(56) References Cited

U.S. PATENT DOCUMENTS

| 6,549,681 | B1 | 4/2003 | Takiguchi et al. |
| 6,714,689 | B1* | 3/2004 | Yano et al. ..................... 382/284 |
| 7,185,283 | B1* | 2/2007 | Takahashi ..................... 715/723 |
| 2003/0107586 | A1 | 6/2003 | Takiguchi et al. |
| 2006/0188175 | A1 | 8/2006 | Takiguchi et al. |

FOREIGN PATENT DOCUMENTS

| JP | 09-091407 A | | 4/1997 |
| JP | 11-069293 A | | 3/1999 |
| JP | 11069293 A | * | 3/1999 |
| JP | 2003-134371 A | | 5/2003 |
| JP | 2004-247793 A | | 9/2004 |
| JP | 2005-252739 A | | 9/2005 |
| JP | 2000-156818 A | | 6/2006 |

OTHER PUBLICATIONS

Notice of Reasons for Rejection, dated Aug. 25, 2011, issued in corresponding JP Application No. 2007-106316, 6 pages in English and Japanese.

* cited by examiner

*Primary Examiner* — Gregory F Cunningham
(74) *Attorney, Agent, or Firm* — Sughrue Mion, PLLC

(57) ABSTRACT

An imaging apparatus displays and records any area in a synthesized image according to user's taste. The synthesized image is displayed based on the set display area and the record area is set to display the synthesized image, so that the display area is compared with the record area to enable easily confirming whether the actually acquired synthesized image satisfies the area desired by the user and assisting recording in an area where a better composition is provided even if the user is unfamiliar with the composition.

20 Claims, 17 Drawing Sheets

FRAME WHICH IS THE MAXIMUM IN SCORE IS SELECTED FROM AMONG FRAMES Y1, Y2 AND Y3 TO DETERMINE RECORD AREA.

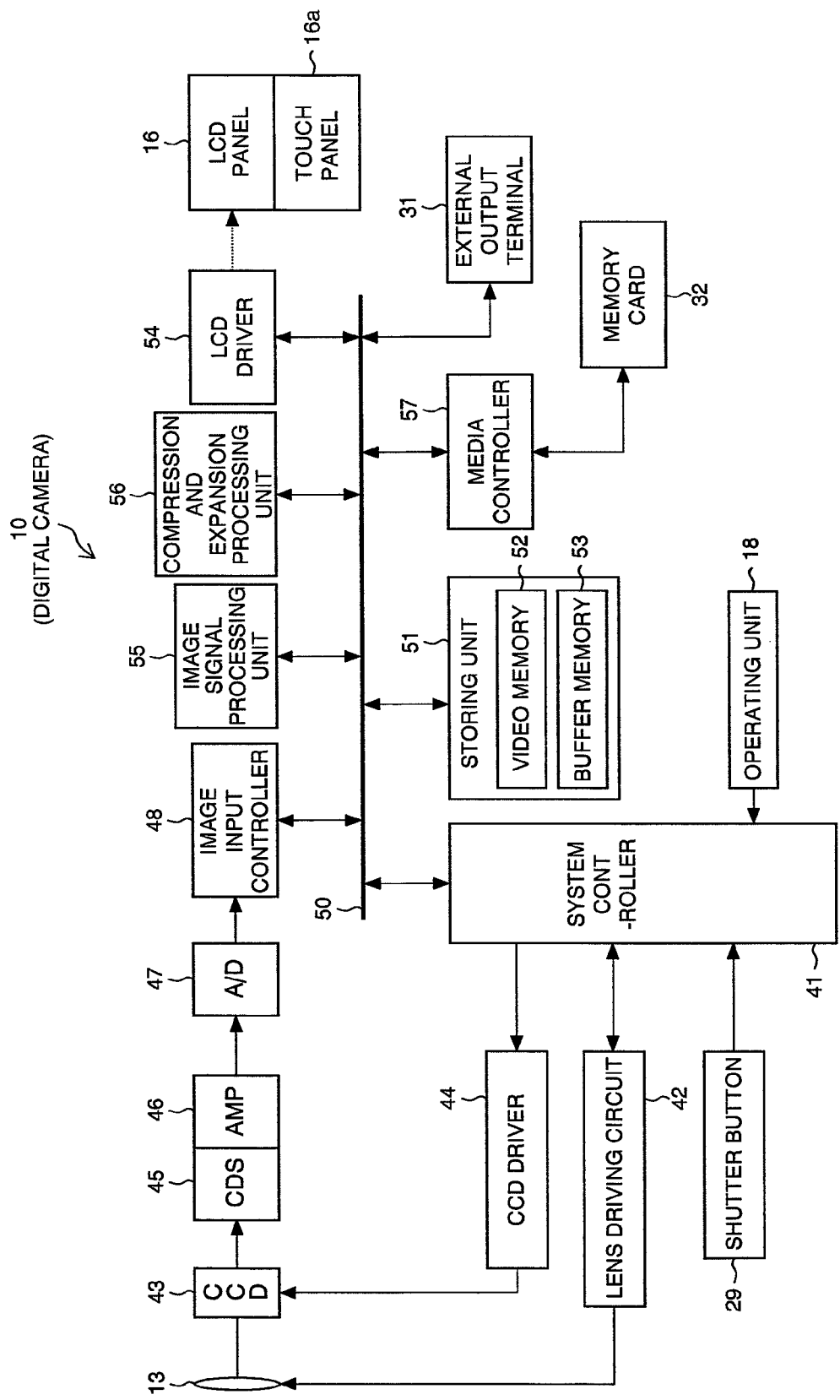

(N-1) TH SYNTHESIZED IMAGE

N-TH SHOT IMAGE

NEWLY SYNTHESIZED IMAGE

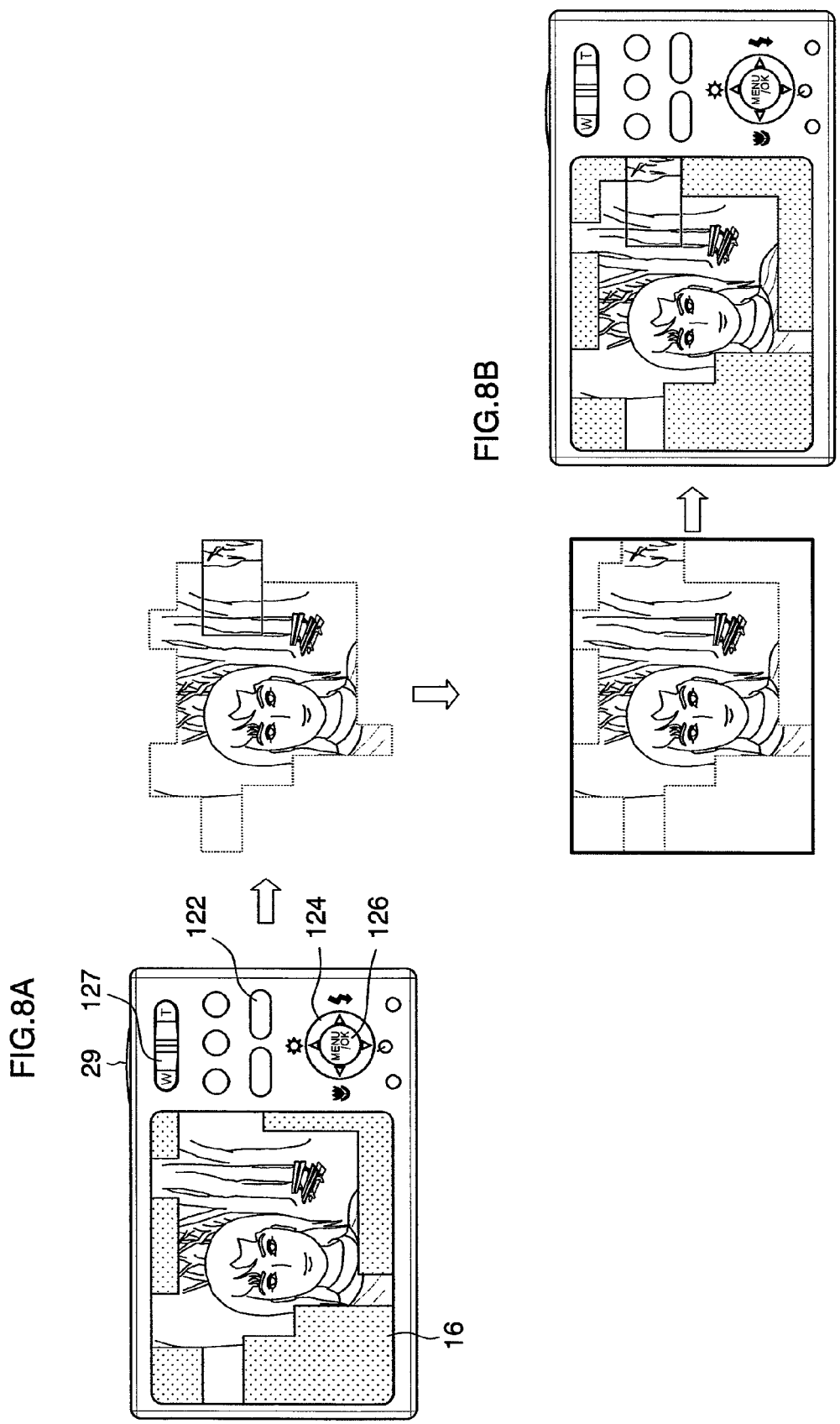

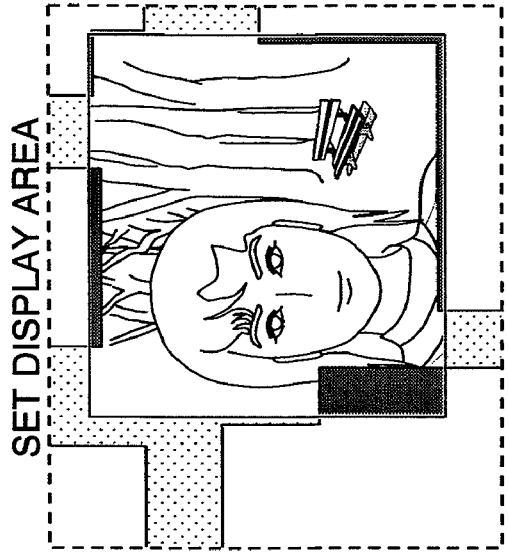
FIG.9B SET DISPLAY AREA
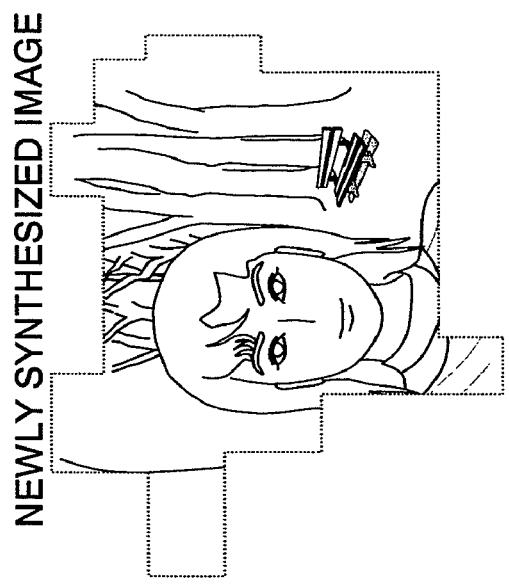
FIG.9A NEWLY SYNTHESIZED IMAGE
PICKED-UP AREA S1 OUTSIDE DISPLAY AREA
NON-PICKED-UP AREA S2 INSIDE DISPLAY AREA WHEN MAXIMUM AREA IS SELECTED, FRAME Y3 IS SELECTED. FOR OTHER EVALUATION METHODS, AREA WHOSE ASPECT RATIO IS ABOUT 4:3 OR 16:9 MAY BE SET TO RECORD AREA. EVALUATION VALUES IN COMBINATION OF PLURAL EVALUATION METHODS MAY BE USED.

FRAME WHICH IS THE MAXIMUM IN SCORE IS SELECTED FROM AMONG FRAMES Y1, Y2 AND Y3 TO DETERMINE RECORD AREA.

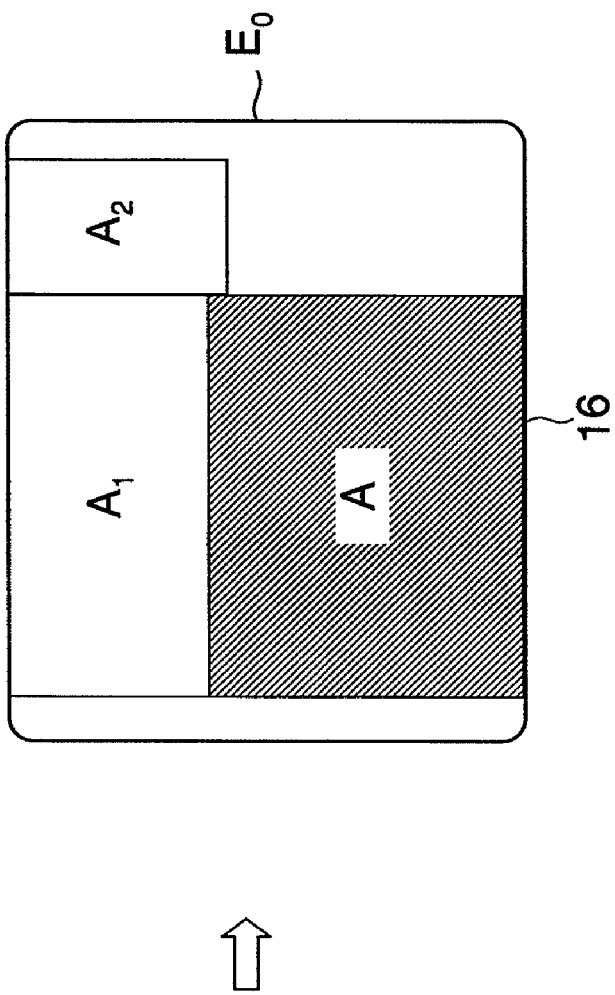
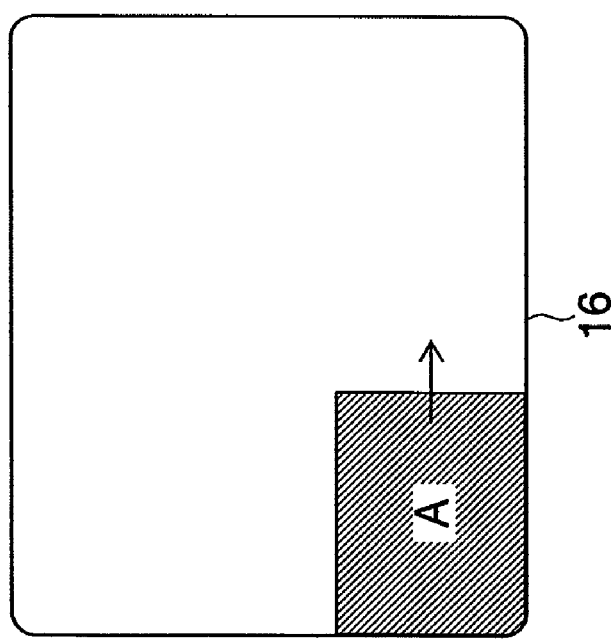

ing unit at the sequential shooting interval; an image synthesizing unit which subjects the plurality of image data stored in the storing unit to an image synthesizing process so that duplicated areas between images are superimposed; a display area setting unit which sets a display area in a synthesized image obtained from the image synthesizing process by the image synthesizing unit; a display unit which displays the display area set by the display area setting unit; a record area setting unit which sets a record area based on the display area displayed on the display unit; and a recording unit which records image data in the record area set by the record area setting unit.

IMAGING APPARATUS, METHOD AND PROGRAM

BACKGROUND OF THE INVENTION

1. Field of the Invention

The present invention relates to an apparatus, method and program for synthesizing a plurality of images to produce one image and display it.

2. Description of the Related Art

According to Japanese Patent Application Laid-Open No. 2003-134371, a camera is capable of pick up images from the start to the end of shooting as one image, because it is provided with a calendar clock which obtains the time, an image pickup device which captures a plurality of object images for each of the time, a matching device which performs a pattern matching for searching a matched portion from among images before and after the plurality of captured images, an image extracting device which extracts part of the image in the longitudinal direction or part of the image in the transverse direction from the images subjected to the pattern matching and an image synthesizing device which joins together the part of the extracted image for each of the time.

According to Japanese Patent Application Laid-Open No. 2000-156818, various variables and an internal buffer are initialized. A slit image is generated from a video frame currently captured by utilizing the detected numerical values (the position and speed of a moving body). A determination is made as to whether the generated slit image belongs to the left side or the right side. A panoramic image stored in an internal buffer is scrolled in the left or right direction only by the width w of the slit image generated at the preceding step. The slit image obtained at a step 302 is copied on the space of the internal buffer obtained by the scroll processing at the preceding step to obtain a current panoramic image. Finally, a determination is made as to whether a system finishes operating.

According to Japanese Patent Application Laid-Open No. 11-69293, an area wider than a field image captured by a CCD is set as a still image area. A camera is moved longitudinally and transversely to capture images all over the area. The captured area is stored in a frame memory and displayed on a finder as a captured image. The area not yet captured is displayed in blue as a non-captured area. A latest image is displayed on a moving image area. If a duplication rate between the field images in an area and an adjacent area is smaller than a minimum duplication rate, the portion is displayed as a missing area. If the missing area protrudes from the area, the area is automatically extended.

In the Japanese Patent Application Laid-Open Nos. 2003-134371 and 2000-156818, however, it is unclear how images are superimposed between frames, a gap is apt to be formed between the frames and images may not be able to be synthesized during capturing. In the Japanese Patent Application Laid-Open No. 11-69293, the area of a synthesized still picture is equal to an integral multiplication of a captured area, which makes it difficult to capture images at an angle of view desired by a user and record the images.

SUMMARY OF THE INVENTION

The present invention has its object to display and record any area in a synthesized image according to the user's taste.

An imaging apparatus according to the present invention includes: an imaging unit which picks up an object; a setting unit which sets a synthesis imaging mode; an imaging control unit which controls imaging in the imaging unit based on a predetermined sequential shooting interval according to the setting unit setting the synthesis imaging mode; a storing unit which stores a plurality of image data picked up by the imaging unit at the sequential shooting interval; an image synthesizing unit which subjects the plurality of image data stored in the storing unit to an image synthesizing process so that duplicated areas between images are superimposed; a display area setting unit which sets a display area in a synthesized image obtained from the image synthesizing process by the image synthesizing unit; a display unit which displays the display area set by the display area setting unit; a record area setting unit which sets a record area based on the display area displayed on the display unit; and a recording unit which records image data in the record area set by the record area setting unit.

According to the present invention, a display area is set to any size according to a range shot by a user to enable a synthesized image to be expanded to and displayed in the size desired by the user.

It does not always need to shoot all over the display area. Completely shooting an area desired to be recorded allows recording only the record area.

An imaging apparatus according to the present invention includes: an imaging unit which picks up an object; a setting unit which sets a synthesis imaging mode; an imaging control unit which controls imaging in the imaging unit based on a predetermined sequential shooting interval according to the setting unit setting the synthesis imaging mode; a storing unit which stores a plurality of image data picked up by the imaging unit at the sequential shooting interval; an image synthesizing unit which subjects the plurality of image data stored in the storing unit to an image synthesizing process so that duplicated areas between images are superimposed; a specifying unit which specifies a desired area based on input operation; a display area setting unit which sets a display area in a synthesized image obtained from the image synthesizing process by the image synthesizing unit based on the area specified by the specifying unit; a display unit which displays the display area set by the display area setting unit; a recording area setting unit which sets a recording area based on the display area displayed on the display unit; and a recording unit which records image data in the recording area set by the recording area setting unit.

According to the present invention, an area desired by the user can be specified to the display area.

The display area setting unit includes: a circumscribed area setting unit which sets an area enclosed by a rectangle circumscribing the synthesized image to the display area; and a coloration unit which colors a predetermined color to part where a synthesized image does not exist in the display area set by the circumscribed area setting unit.

This allows setting the display area to be any size as well as an integral multiplication of a constant area unlike a conventional art.

This ensures that a portion where images are not picked up is indicated by coloration and the portion where the coloration is not provided has no gap between the portions where images are not picked up.

The display area setting unit includes: a temporary display area setting unit which sets a temporary display area; a temporary setting control unit which controls the temporary display area setting unit to minimize V, where an area of a first area where the synthesized image exists outside the temporary display area set by the temporary display area setting unit is taken as S1, an area of a second area where the synthesized image does not exist inside the temporary display area is taken as S2, a W1 and W2 are taken as a predetermined weighting constant and V=W1×S1+W2×S2; a regular setting unit which sets a temporary display area in which the V is minimized to the display area; and a coloration unit which colors a predetermined color to part where the synthesized image does not exist in the display area set by the regular setting unit.

Here, W1 and W2 are combination weightings and W1=W2=0.5, for example.

This allows setting the display area to be any size as well as an integral multiplication of a constant area unlike a conventional art.

This also minimizes the picked up portion outside the display area and the non-picked up portion inside the display area to permit displaying the picked up portion and the non-picked up portion without uncomfortableness.

The specifying unit includes a depression detecting unit which detects an operation of depressing a position corresponding to the position where the display area exists, and the display area setting unit sets the display area based on the depressed position detected by the depression detecting unit.

The specifying unit includes an input detecting unit which detects inputting operations for specifying the desired area, and the display area setting unit sets the display area based on the inputting operations detected by the input detecting unit.

The record area setting unit includes: a temporary record area setting unit which sets a temporary record area; an evaluation value calculating unit which calculates an evaluation value related to part where the synthesized image exists in the temporary record area set by the temporary record area setting unit; a temporary setting control unit which controls the temporary record area setting unit to set the temporary record area so that the evaluated value calculated by the evaluation value calculating unit satisfies a predetermined condition; and a regular setting unit which sets a temporary record area in which the evaluated value is maximized to the record area, and the display unit displays the recording area set by the regular setting unit.

According to the present invention, the record area is also displayed and the user can easily judge whether the area desired to be picked up is completely picked up.

The record area setting unit includes: a temporary record area setting unit which sets a temporary record area; a composition evaluation-value calculating unit which calculates a composition evaluation-value related to the composition of the synthesized image existing in the temporary record area set by the temporary record area setting unit; a temporary setting control unit which controls the temporary record area setting unit to set the temporary record area in which a composition evaluation-value calculated by the composition evaluation-value calculating unit is maximized; and a regular setting unit which sets a temporary record area in which the composition evaluation-value is maximized to the record area, and the display unit displays the record area set by the regular setting unit.

According to the present invention, the record area is also displayed and the user can easily judge whether the area desired to be picked up is completely picked up.

The display can provide the user with a suggestion on how to record with a better composition even if the user is unfamiliar with the composition.

The evaluation value calculating unit calculates at least one of the area of the part where the synthesized image exists and an aspect ratio, and the predetermined condition includes at least one of the area being maximized, the aspect ratio being 4:3 and the aspect ratio being 16:9.

The imaging apparatus further includes: an expansion display control unit which expands a desired portion of the synthesized image and controls the display unit to display symbols indicating the direction where non-display portion of the synthesized image exists; and a direction specifying unit which specifies a moving direction from the currently expanded displayed portion to a desired non-display portion according to input operations; wherein the expansion display control unit controls the display unit to partially expand and display the synthesized image while scrolling the synthesized image from the currently expanded displayed portion toward a non-display portion existing in the moving direction specified by the direction specifying unit.

The expansion display control unit controls the display unit to display a neighboring area including the currently expanded displayed portion according to the direction specifying unit specifying a moving direction which is different from the direction where non-display portion exists and is indicated by the symbol.

An imaging method according to the present invention includes the steps of: setting a synthesis imaging mode; picking up an image based on a predetermined sequential shooting interval according to the synthesis imaging mode being set; storing a plurality of image data picked up at the sequential shooting interval; subjecting the stored plurality of image data to an image synthesizing process so that duplicated areas between images are superimposed; setting a display area in a synthesized image obtained from the image synthesizing process; displaying the set display area; setting a record area based on the displayed display area; and recording image data in the set record area.

An imaging method according to the present invention includes the steps of: setting a synthesis imaging mode; picking up an image based on a predetermined sequential shooting interval according to the synthesis imaging mode being set; storing a plurality of image data picked up at the sequential shooting interval; subjecting the stored plurality of image data to an image synthesizing process so that duplicated areas between images are superimposed; specifying a desired area based on input operation; setting a display area in a synthesized image obtained from the image synthesizing process based on the specified area; displaying the set display area; setting a record area based on the displayed display area; and recording image data in the set record area.

A program causing a computer to execute these imaging methods is included in the present invention.

According to the present invention, a display area is set to any size according to an area shot by a user to enable a synthesized image to be expanded to and displayed in size which the user wants.

It does not always need to shoot all over the display area of the display unit. Completely shooting an area desired to be recorded allows only the record area to be recorded.

BRIEF DESCRIPTION OF THE DRAWINGS

FIG. 3 is a functional block diagram of the digital camera;
FIGS. 8A and 8B are schematic diagrams displaying a display area (circumscribing area) set in a synthesized image;

FIGS. 9A and 9B are schematic diagrams displaying a display area (area minimizing V) set in a synthesized image;

FIGS. 17A and 17B are examples of zoom out images.

DETAILED DESCRIPTION OF THE PREFERRED EMBODIMENTS

First Embodiment

Figure 1:
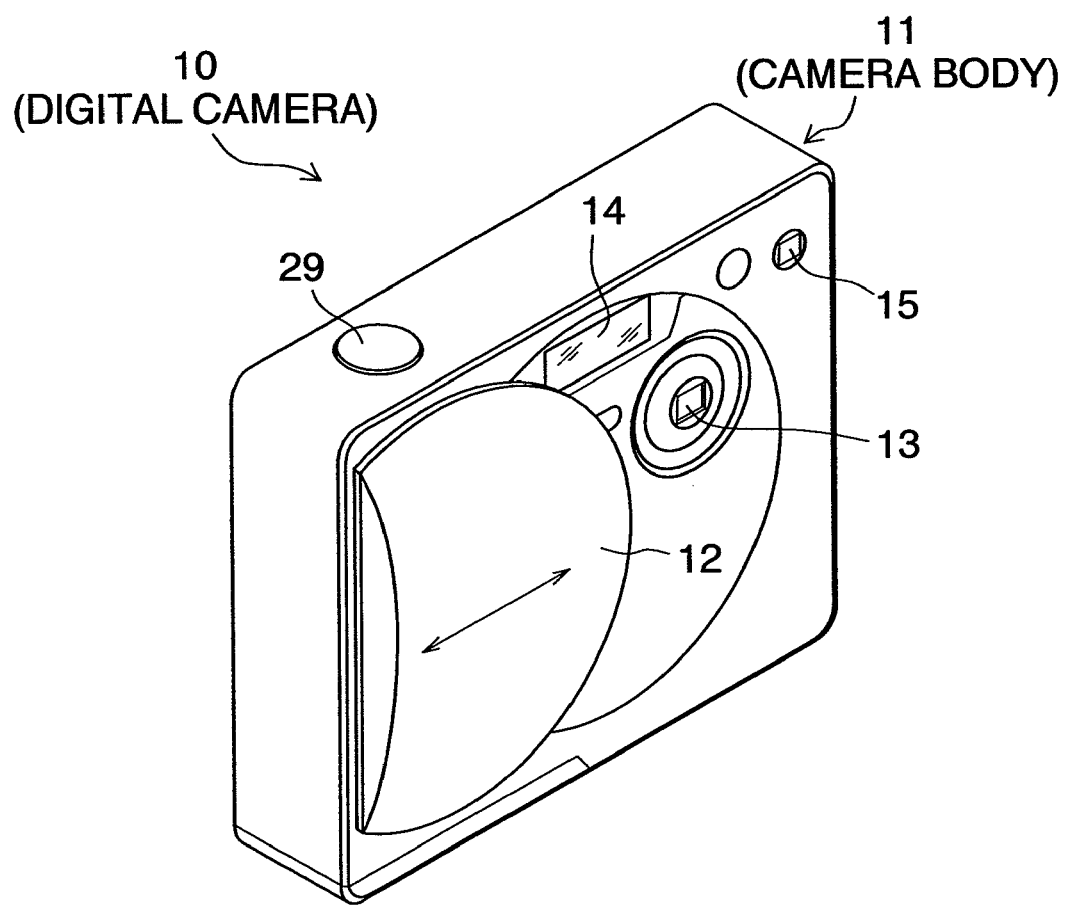
FIG. 1 is a front view of a digital camera.

FIG. 1 is an external perspective view illustrating the configuration of front side of a digital camera. As illustrated in FIG. 1, a digital camera 10 is equipped with a lens barrier 12 which is slidable in the direction indicated by an arrow in the figure on the front side of a camera body 11. Sliding the lens barrier 12 to an open position illustrated in FIG. 1 exposes an imaging lens 13 and a flash light emitting unit 14 to the front face. The lens barrier 12 also acts as a power supply switch, turns on the power supply when it is slid to the open position to bring the camera into an imageable mode and turns off the power supply when it is slid to a shield position in which the imaging lens 13 and the flash light emitting unit 14 are shielded. A finder objective window 15 which forms an optical finder is provided on the front face of the camera body 11.

Figure 2:
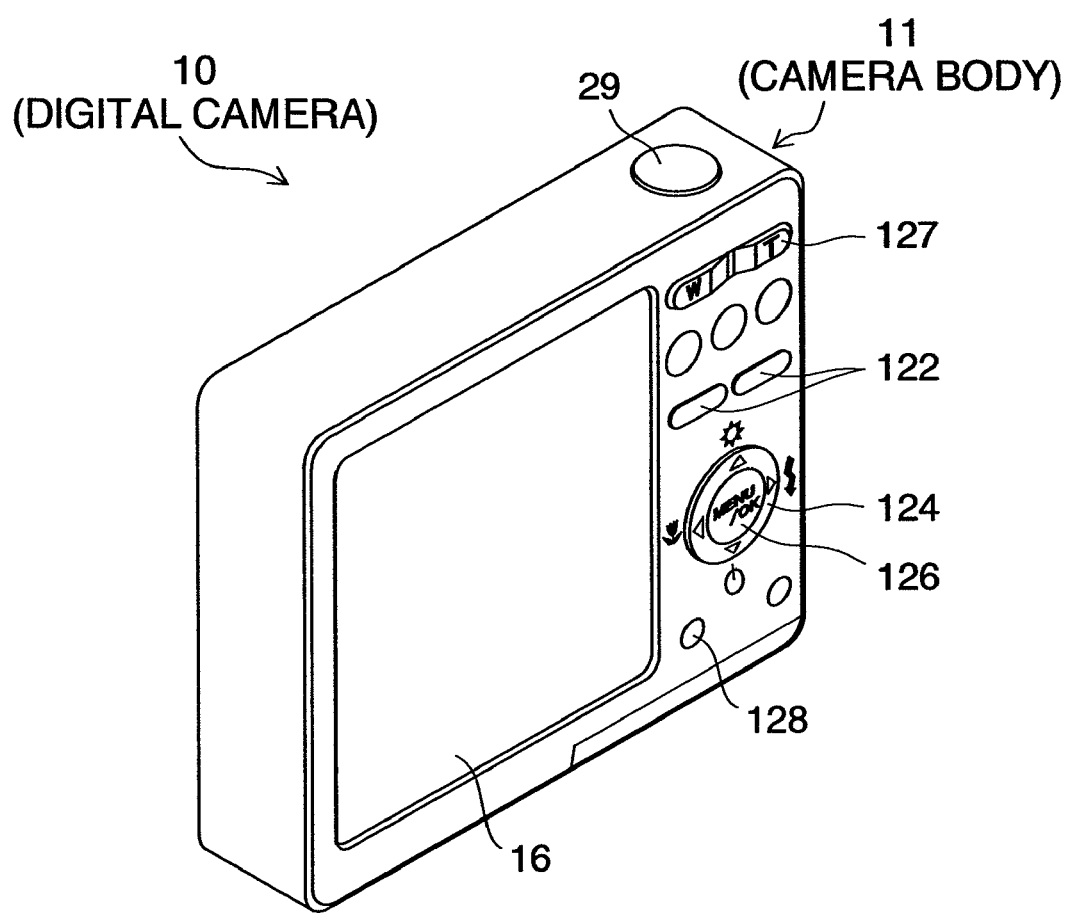
FIG. 2 is a rear elevation of the digital camera.

FIG. 2 is a rear elevation of the camera 10. A zoom switch 127 is disposed on the back face of the camera 10. Continuing to press a wide position (W) of the zoom switch 127 extends the imaging lens 13 toward a wide end (telephoto) and continuing to press a telephoto position (T) of the other side of the zoom switch 127 moves the imaging lens 13 to a telephoto end (wide angle).

An LCD panel 16, a switch button 122, a cross key 124 and an information position specifying key 126 are also provided on the back face of the camera 10. The cross key 124 is operated to adjust a display brightness and set a self timer, macro shooting and flash shooting by the upper, lower, left and right triangular symbols on the cross key 124 respectively.

The switch button 122 is a switch for changing over shooting and reproducing images at discretion. The switch button 122 is changed over toward "shooting" side to shoot images and toward "reproducing" side to reproduce images.

The switch button 122 selects a normal shooting mode and panoramic shooting mode. The switch button 122 is operated to bring the camera into the panoramic shooting mode, moving a zooming position of the imaging lens 13 to minimize the distortion of the imaging lens 13.

A shutter button 29 is provided on the top face of the camera body 11. The shutter button 29 is of a two-stroke switch. A shooter performs framing using the LCD panel 16 or the optical finder, then softly depresses (half depressing) the shutter button 29 to subject the camera to various shooting preparation processes such as an exposure adjustment and focusing adjustment of the imaging lens 13 and forcibly depresses once again (fully depressing) the shutter button 29 to conduct shooting.

A memory card slot 30 and an external output terminal 31 are provided on the side face of the camera body 11. The memory card slot 30 is detachably loaded with a memory card 32 being a recording medium in which image data is recorded. The external output terminal 31 is a USB terminal, for example, and is used to output image data recorded in the memory card 32 to an external apparatus such as, for example, a personal computer.

FIG. 3 is a block diagram illustrating an electrical configuration of the digital camera 10. As illustrated in FIG. 3, the digital camera 10 includes a system controller 41 being a control device for controlling the entire camera. The system controller 41 includes a memory which stores control programs and various control data and controls each unit in accordance with the programs and the data.

The system controller 41 is connected to a lens driving circuit 42. The lens driving circuit 42 drives a motor (not shown) in accordance with an instruction from the system controller 41 to cause the imaging lens 13 to advance and retreat along an optical axis to adjust an optical shooting magnification and a focus. The system controller 41 acquires information on a zoom lens position of the imaging lens 13, i.e., an angle of view from the lens driving circuit 42 to perform the panoramic shooting. A CCD image sensor 43 being an image pickup device is arranged on the back of the imaging lens 13.

The CCD image sensor 43 is connected to the system controller 41 through a CCD driver 44. The system controller 41 controls the CCD driver 44 to drive the CCD image sensor 43 to cause a correlation double sampling circuit (CDS) 45 to output an image signal in which an object image is photoelectrically converted into an electric signal.

The imaging signal being an analog signal whose noise is removed at the CDS 45 is amplified by an AMP 46. Thereafter, the image signal is converted from an analog signal to a digital signal by an A/D converter 47 and outputted as an image data to an image input controller 48.

The image input controller 48 is connected to the system controller 41 and a storing unit 51 through a data bus 50. The system controller 41 controls the image input controller 48 to store the image data into the storing unit 51. The storing unit 51 is provided with a video memory 52 and a buffer memory 53.

The video memory 52 temporarily stores image data lower in resolution at the time of displaying images on the LCD panel 16. The image data stored in the video memory 52 is transmitted to an LCD driver 54 through the data bus 50. The LCD driver 54 subjects the image data to a signal processing so as to display images on the LCD panel 16.

The buffer memory 53 is a storing device for working to temporarily store shot image data higher in resolution. The system controller 41 is connected to an image signal processing unit 55 through the data bus 50. The image signal processing unit 55 subjects the shot image data to various image processings such as, for example, gray scale modification, color conversion, hypertone processing and hyper-sharpness processing while the shot image data higher in resolution is being stored in the buffer memory 53. The image signal processing unit 55 is an image synthesizing device which synthesizes a plurality of image data to one image data, subjects a plurality of image data to a synthesizing process to produce a panoramic image data (synthesized image) being one image data when a plurality of image data is stored in the buffer memory 53 in the panoramic mood and stores the panoramic image data in the buffer memory 53. The image signal processing unit 55 sets a record area to the panoramic image data in accordance with the instruction inputted into an operating unit 18, trims the area and stores it into the buffer memory 53 as the recording image.

The system controller 41 is connected to a compression and expansion processing unit 56, an external output terminal 31 and a media controller 57 through the data bus 50. The compression and expansion processing unit 56 subjects the image data stored in the buffer memory 53 to compression processing based on the compression format such as JPEG system. The system controller 41 controls the media controller 57 to store the compressed image data into the memory card 32. The compression and expansion processing unit 56 subjects the compressed image data to expansion processing at the time of reproducing the image data stored in the memory card 32.

The system controller 41 is connected to the shutter button 29 and the operating unit 18. The shutter button 29 issues an image shooting instruction to the system controller 41 when it is depressed. The operating unit 18 includes the forgoing buttons 122, 124, 126 and 127 and issues instructions corresponding to each operation to the system controller 41 when it is manually operated by a shooter.

In the panoramic shooting mode, depressing the shutter button 29 causes the system controller 41 to control the CCD driver 44, driving the CCD image sensor 43, which conducts a first shooting. After that, a predetermined shooting interval (sequential shooting interval) is set each time the camera body 11 is sequentially rotated and moved in the yaw and pitch directions by the shooter and the CCD image sensor 43 is driven based on the shooting interval to automatically conduct the shooting until the shutter button 29 is depressed again.

An angle of view in shooting ranges adjoined by the rotation movement of the camera body 11 is preferably set to duplicate parts. For example, as illustrated in FIG. 4A, three sequential shooting images 61, 62 and 63 are shot with the superimposed areas 61a, 62a, 62b and 63a formed so that the transverse ends of the images are superimposed on each other.

Figure 4A:
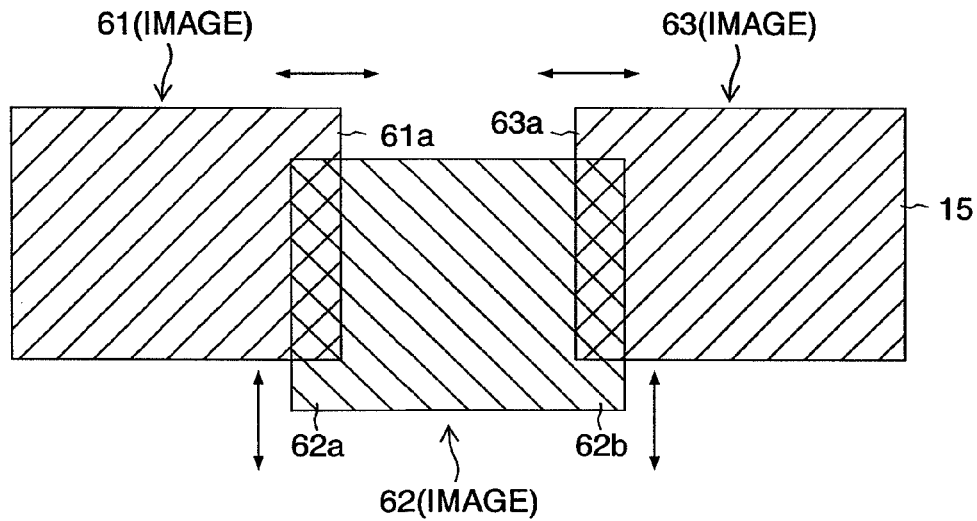
FIGS. 4A and 4B are schematic diagrams illustrating a process of producing a synthesized image by an image processing.

As illustrated in FIG. 4A, the image signal processing unit 55 subjects each image data to an image processing whereby the images 61, 62 and 63 are moved in the transverse direction and in the upper and lower directions to cause their respective superimposed areas 61a, 62a, 62b and 63a to coincide to each other.

Figure 4B:
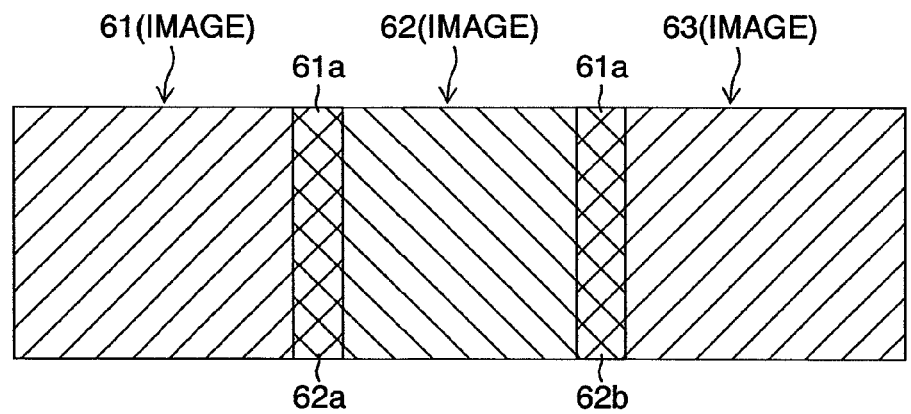

As illustrated in FIG. 4B, each image data is subjected to the image processing whereby each image is synthesized with superimposed areas coinciding to each other, thereby synthesizing a plurality of image data to one panoramic shot image.

However, the user moves the camera body 11 at will to set a shooting range, so that there may exist image data without superimposed areas or with uneven superimposed areas between the images among the plurality of image data. In addition, even if all acquired images are synthesized to be superimposed on each other, a synthesized panoramic image is not always perfect rectangular (refer to FIG. 14).

The outline of a synthesis shooting process of the digital camera 10 is described below.

The shooter operating the switch button 122 allows the camera to be brought into the panoramic shooting mode. Switching the camera into the panoramic shooting mode causes the system controller 41 to control the lens driving circuit 42 to move the zooming position of the imaging lens 13 to a position in which distortion is minimized. When a normal shooting mode is set, a synthesis shooting process is not conducted.

After that, when the shutter button 29 is not depressed, a standby state is maintained. The shooter depressing the shutter button 29 causes the system controller 41 to control the CCD driver 44 to drive the CCD image sensor 43, conducting a first shooting. The shooter moves the camera body 11 so as to superimpose parts of adjacent shooting ranges. It is optional how the shooter moves the camera, however, the shooter needs to move it to cover the desired shooting range. The system controller 41 sets an appropriate shooting interval.

After that, the system controller 41 controls the CCD driver 44 based on the shooting interval until the shutter button 29 is depressed again, thereby driving the CCD image sensor 43 to automatically conduct shooting several times. Incidentally, the shooting is performed a predetermined number of times, for example, 20 times. The system controller 41 controls the CCD driver 44 in the time of shooting to adjust the shutter speed of the electronic shutter so that images to be shot are not shaken.

A plurality of image data obtained by the shooting is stored in the buffer memory 53. Thereby, as illustrated in FIG. 7, such a plurality of image data that the positions of adjacent superimposed areas coincide to each other is produced, subjected to image processing and synthesized to produce one panoramic image data. The synthesis processing is repeated each time the image data is obtained. Only the set display area of the synthesized image data is displayed on the LCD panel 16. The setting of the display area is described later.

After shootings performed a predetermined number of times are finished, the image signal processing unit 55 trims the set record area from the synthesized image. The setting of the record area is described later.

The system controller 41 controls the compression and expansion processing unit 56 to subject the trimmed record area to compression processing and controls the media controller 57 to record the compressed panoramic image data in the memory card 32.

After that, when the switch button 122 is changed over to other modes, that is, the normal shooting mode or the reproduction mode, or the lens barrier 12 is slid to the shield position to turn the power supply off, the synthesis shooting process is completed. When the switch button 122 is not changed over to other modes and the power supply remains turned on, the camera is brought into the standby state again and repeats the synthesis shooting process when the shutter button 29 is depressed.

When the shot panoramic image is reproduced, as is the case with a normal image data, the system controller 41 controls the media controller 57 to read the image data from the memory card 32 and controls the compression and expansion processing unit 56 to subject the read image data to expansion processing. Thereafter, the system controller 41 controls the LCD driver 54 to display the panoramic image on the LCD panel 16.

The flow of synthesis image recording process according to a preferable embodiment of the present invention is described below with reference to the flow chart in FIG. 5.

At a step S1, a determination is made as to whether shooting has been done the predetermined number of times. If shooting has been done the predetermined number of times, the process proceeds to a step S8. If not, the process proceeds to a step S2.

At a step S2, the N-th shooting is performed.

Figure 7A:
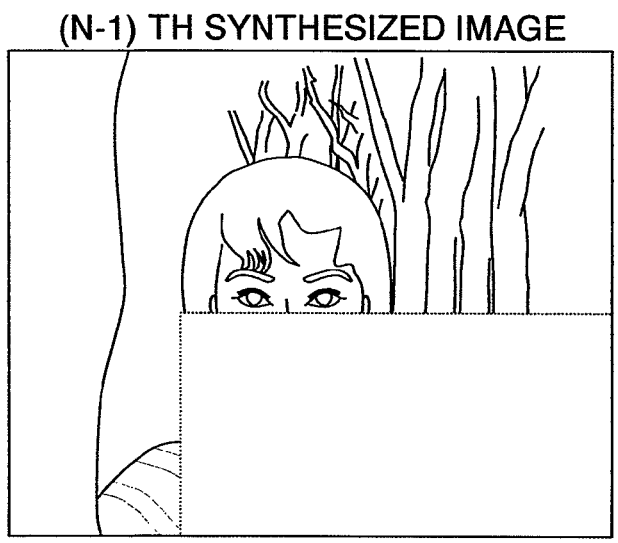
FIGS. 7A, 7B and 7C are examples of synthesized images.
Figure 7B:
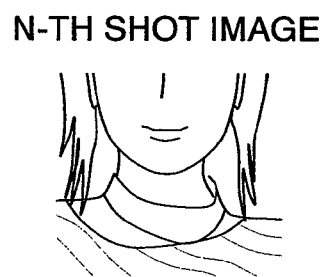
Figure 7C:
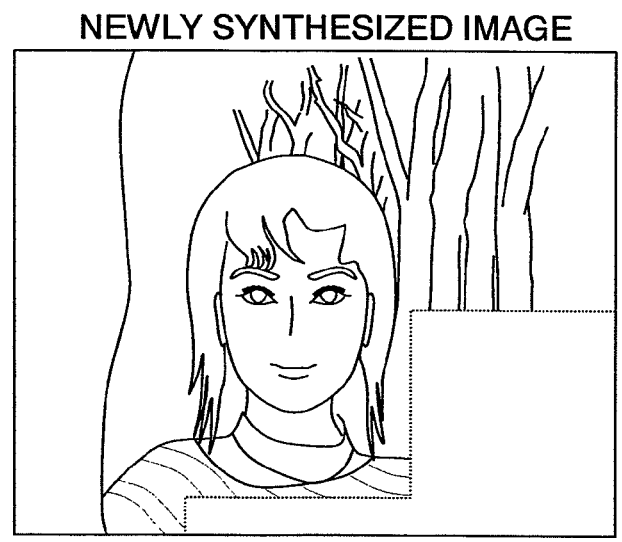

At a step S3, the N-th shot image and the already synthesized image are synthesized to produce a new synthesized image. For example, the image synthesized by the (N-1) th synthesis shooting process as illustrated in FIG. 7A and the N-th shot image illustrated in FIG. 7B are synthesized to produce the N-th synthesized image illustrated in FIG. 7C.

At a step S4, a display area is set based on the N-th synthesized image. The concrete embodiments of setting the display area are described later.

At a step S5, the set display area is displayed on the LCD panel 16.

At a step S6, the record area is set. The concrete embodiments of setting the record area are described later.

At a step S7, the record area is displayed on the LCD panel 16.

At a step S8, the image of the record area is retained in the memory card 32.

Figure 6:
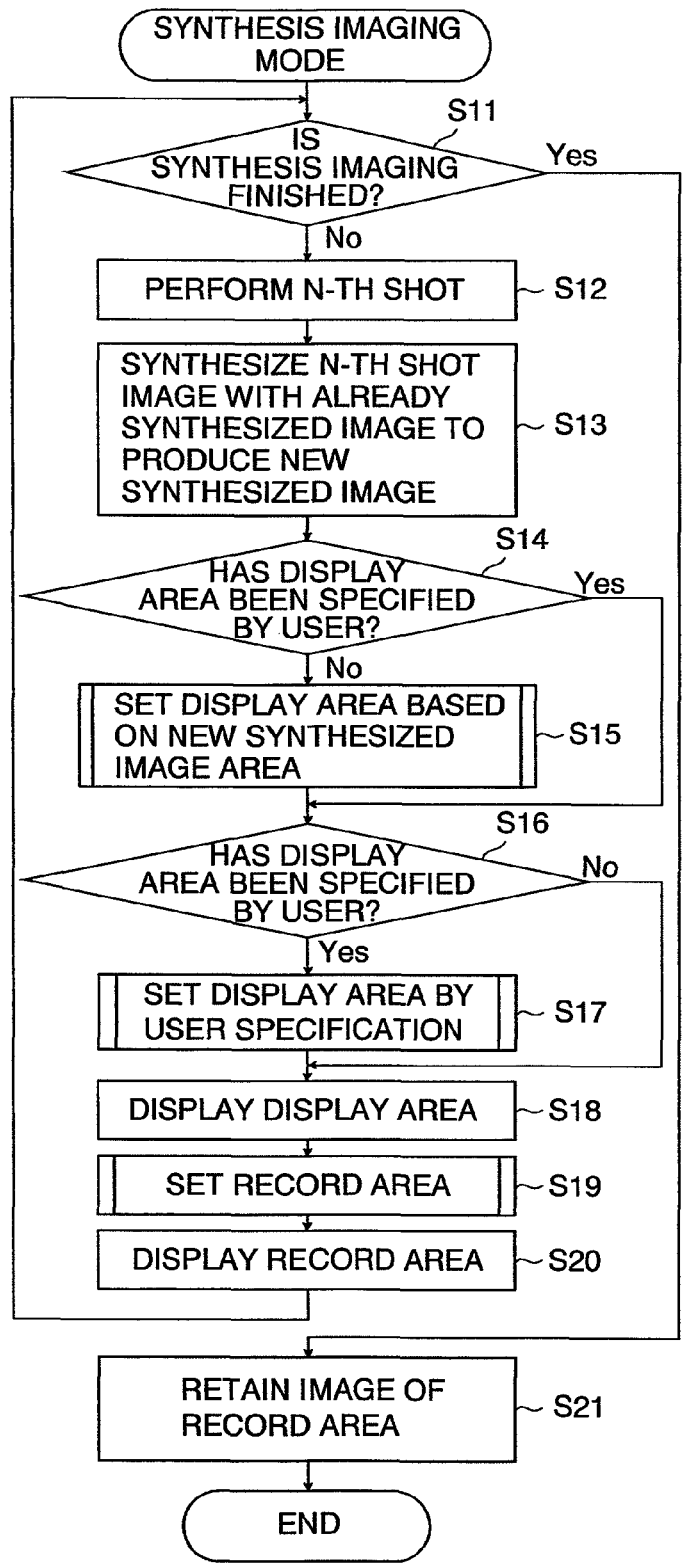
FIG. 6 is a flow chart illustrating one example of a synthesis shooting process.

Alternatively, the display area may be specified according to a user operation as illustrated in the flow chart of the synthesis image recording process in FIG. 6.

Figure 5:
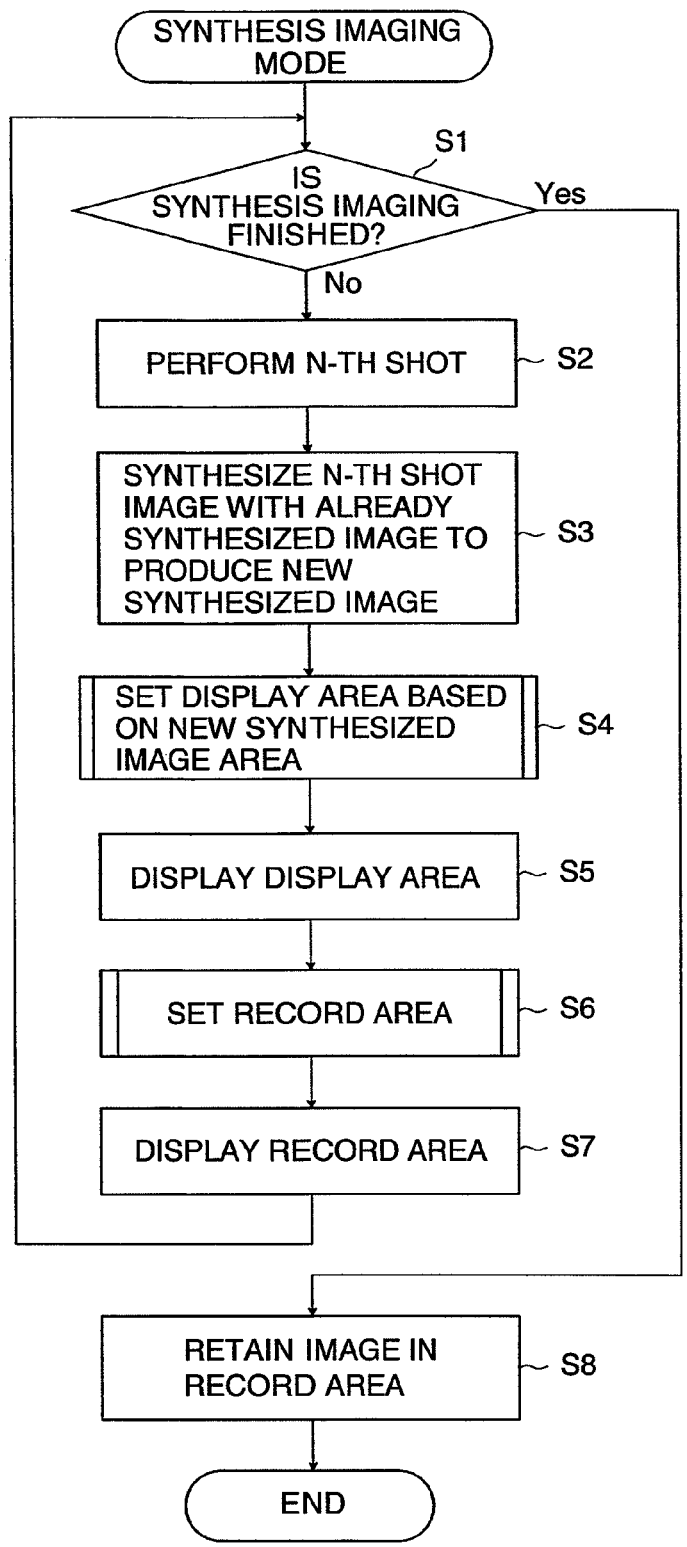
FIG. 5 is a flow chart illustrating one example of a synthesis shooting process.

The steps S11 to S13 in FIG. 6 are same as the steps S1 to S3 in FIG. 5. Incidentally, at a step 11, if it is determined that shooting has been done the predetermined number of times, the process proceeds to a step S21. If not, the process proceeds to a step S12.

At a step S14, a determination is made as to whether the operating unit 18 has specified the display area. If the operating unit 18 has specified the display area, the process proceeds to a step S16, if not, to a step S15.

At a step S15, an area desired to be a display area, among the synthesized images obtained at the step S13, is specified by the operating unit 18. The shooting for each sequential shooting interval is temporarily stopped until this processing is completed.

At a step S16, a determination is made as to whether a display area has been specified at the step S15. If the display area has been specified, the process proceeds to a step S17, if not, to a step S18.

At a step S17, the specified area is set to a display area.

The steps S18 to S21 in FIG. 6 are same as the steps S5 to S8 in FIG. 5.

The concrete embodiments of setting of the display area are exemplified below.

For example, an area enclosed by the rectangle circumscribing the N-th synthesized image illustrated in FIG. 8A is set to a display area as illustrated in FIG. 8B each time the N-th synthesized image is obtained.

Alternatively, for the N-th synthesized image illustrated in FIG. 9A, if the area of the shot portion outside the temporarily set display area in the N-th synthesized image as illustrated in FIG. 9B is taken as S1, the area of non-shot portion inside the temporarily set display area in the N-th synthesized image is taken as S2 and W1 and W2 are taken as predetermined combination weightings, a temporary area enclosed by such a rectangle as to minimize V=W1×S1+W2×S2 is set to a display area. Incidentally, W1 and W2 are set by a manufacturer at discretion. If W1=1 and W2=0, the circumscribing area illustrated in FIGS. 8A and 8B is a display area.

Figure 10B:
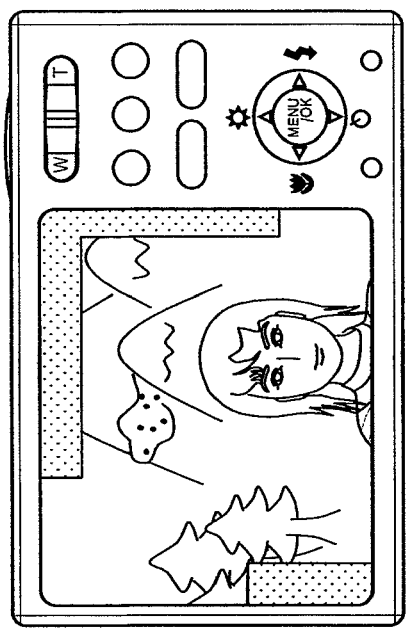
FIGS. 10A and 10B are schematic diagrams displaying a display area set according to instructions on a touch panel on the synthesized image.
Figure 10A:
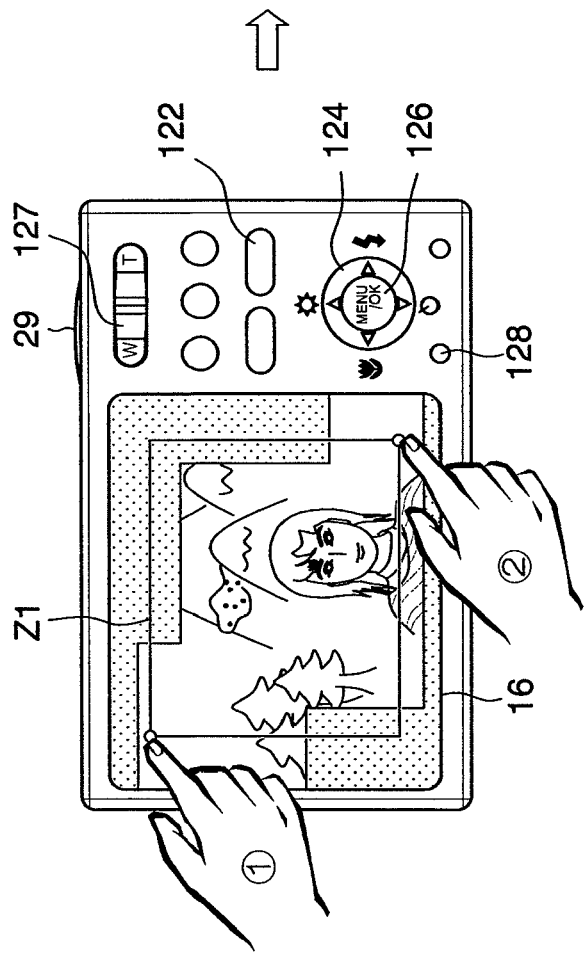

Alternatively, as illustrated in FIG. 10A, the user specifies any two points on a touch panel 16a deposited on the LCD panel 16 to set a rectangular area Z1 with the two specified points as diagonal points to the display area as illustrated in FIG. 10B. This enables setting the area where the user desires shooting to the display area as is. Incidentally, depressing a cancel button 128 cancels the specified display area.

Figure 11B:
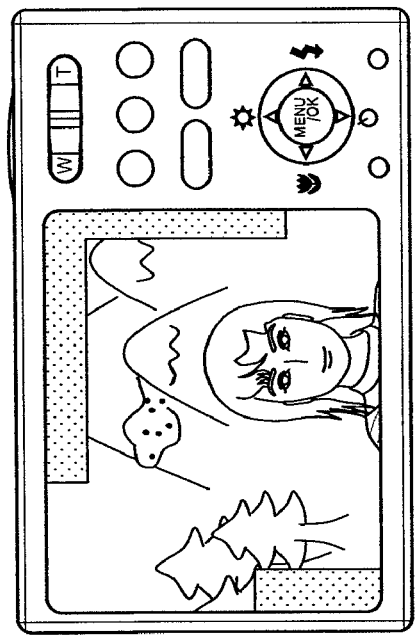
FIGS. 11A and 11B are schematic diagrams displaying a display area set according to button operation.
Figure 11A:
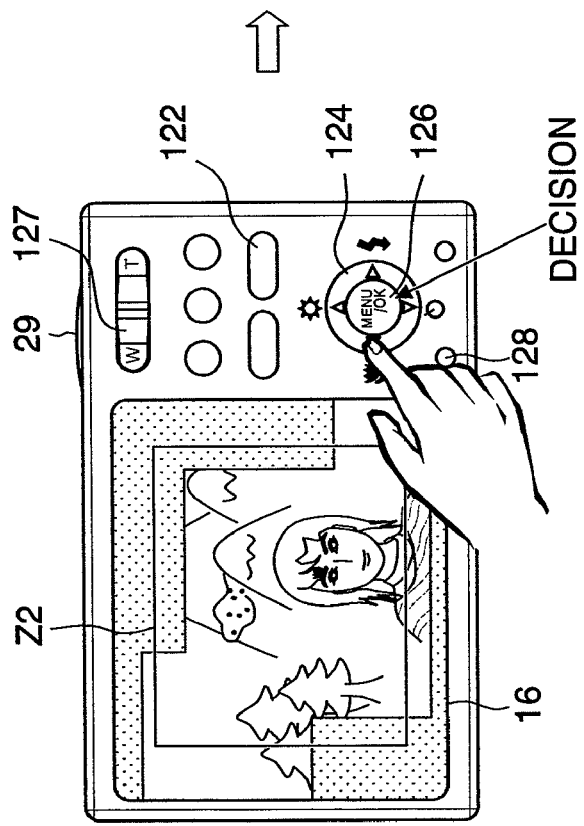

Alternatively, as illustrated in FIG. 11A, the user manually operates the cross button 124 and a decision button 126 to specify a rectangle Z2 in any position and size on the screen of the LCD panel 16, thereby setting the area of the specified rectangle Z2 to the display area as illustrated in FIG. 11B.

The concrete embodiments of setting the record area are described below.

Figure 12B:
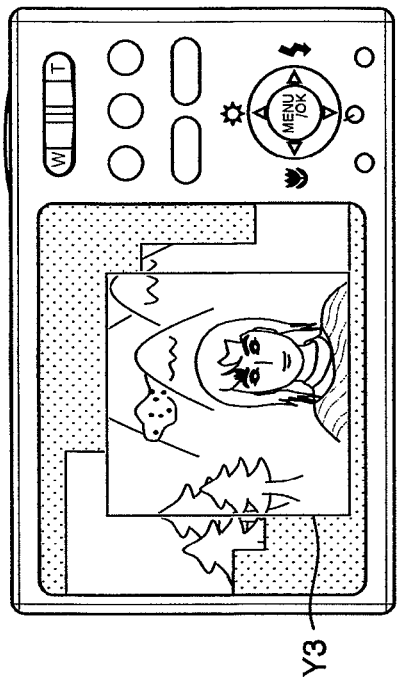
FIGS. 12A and 12B are schematic diagrams displaying a recording area set according to evaluation values of the synthesized image.
Figure 12A:
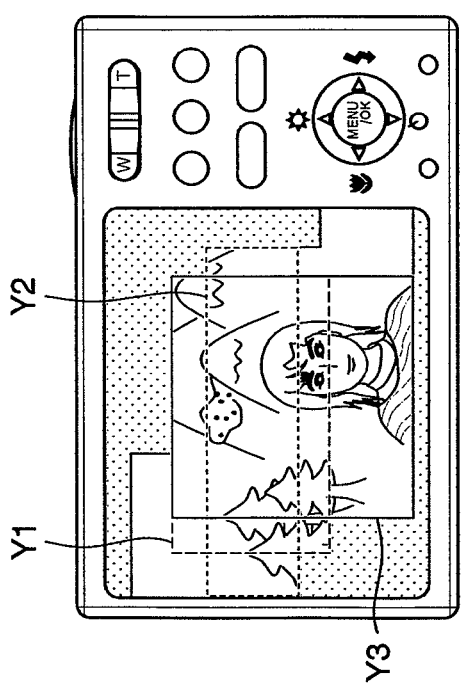

For example, as illustrated in FIG. 12A, the rectangle areas inscribed in the synthesized image are taken as candidates (Y1 to Y3 in the figure) of the record area and the area which is the maximum in size is selected as a record area from among the candidates. As illustrated in FIG. 12B, the selected area is set to the record area and a frame indicating the periphery of the record area is displayed. In the figure, the area enclosed by Y3 is the greatest among Y1 to Y3, so that the area enclosed by Y3 is set to the record area and the frame Y3 is displayed. Incidentally, the user may select his or her desired record area from among the candidates of the record area.

Alternatively, although illustration is omitted, out of the rectangle areas inscribing in the synthesized image the area whose aspect ratio is equal or nearest to a predetermined ratio (4:3 or 16:9) may be set to the record area and displayed.

An evaluation condition in which, for example, a rectangle area inscribed in the synthesized image is the maximum in the candidates and its aspect ratio is equal or nearest to a predetermined ratio may be combined to set the record area. Through the operating unit 18, the user may determine at will which evaluation condition is used or how evaluation conditions are combined.

Figure 13:
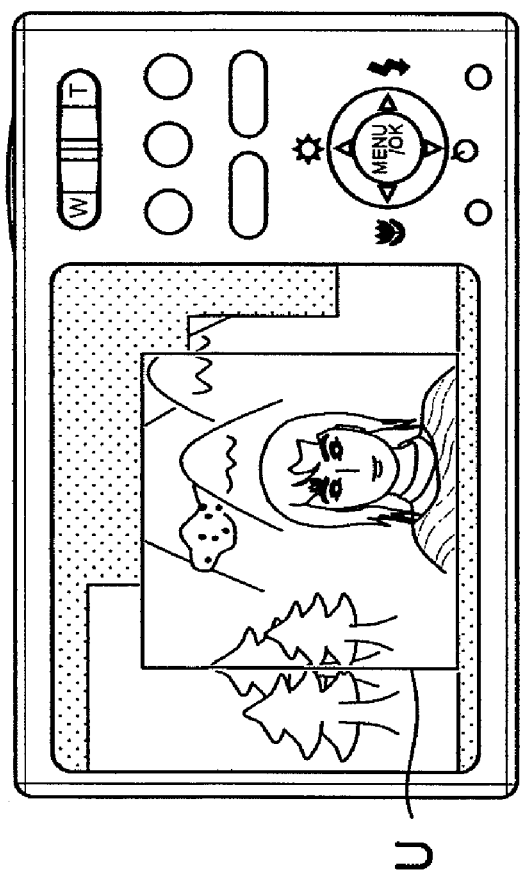
FIG. 13 is a schematic diagram displaying a display area set according to composition analysis of the synthesized image.

Alternatively, as illustrated in FIG. 13, the composition of the synthesized image may be analyzed to set an area being the most preferable in composition to the record area. It is in user's discretion how to analyze the composition. For example, when the camera is brought into a person shooting mode, it is advisable that a face is detected from the synthesized image and a rectangle in the center of which the detected face is located and which is inscribed in the synthesized image is set to the record area. Alternatively, when the camera is brought into a landscape mode and the boundary between sky and land is substantially horizontal, such a rectangle that an area ratio becomes constant, for example, an area ratio of sky to land is 1:3 may be set to the record area.

Thus, the synthesized image is displayed based on the set display area and the record area is set to display the synthesized image, so that the display area is compared with the record area to enable easily confirming whether the actually acquired synthesized image satisfies the area desired by the user and assisting recording in an area where a better composition is provided even if the user is unfamiliar with the composition.

Second Embodiment

Figure 14:
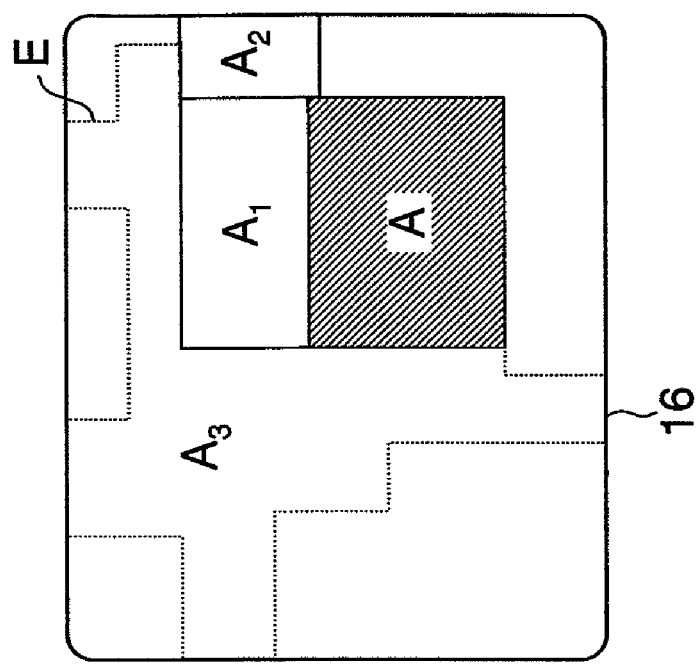
FIG. 14 is one example of a synthesized image.

As described above, the entire shape of the synthesized image is not always perfect rectangular. For example, as illustrated in FIG. 14, a mosaic amorphous synthesized image E may be produced.

Such a synthesized image is partially expanded and displayed on the LCD panel 16 and the expanded portion is scrolled according to the specified scrolling direction by upward, downward, leftward, rightward and oblique depression of the cross key 124. For example, a portion of the area A in FIG. 14 is expanded and displayed, scrollable portions are the areas A1, A2 and A3. However, if only the area A is set to the display area, expanded and displayed, the user cannot realize that scrollable portions are the areas A1, A2 and A3. For this reason, the user may issue a useless instruction for the direction in which the areas cannot be scrolled.

Figure 15:
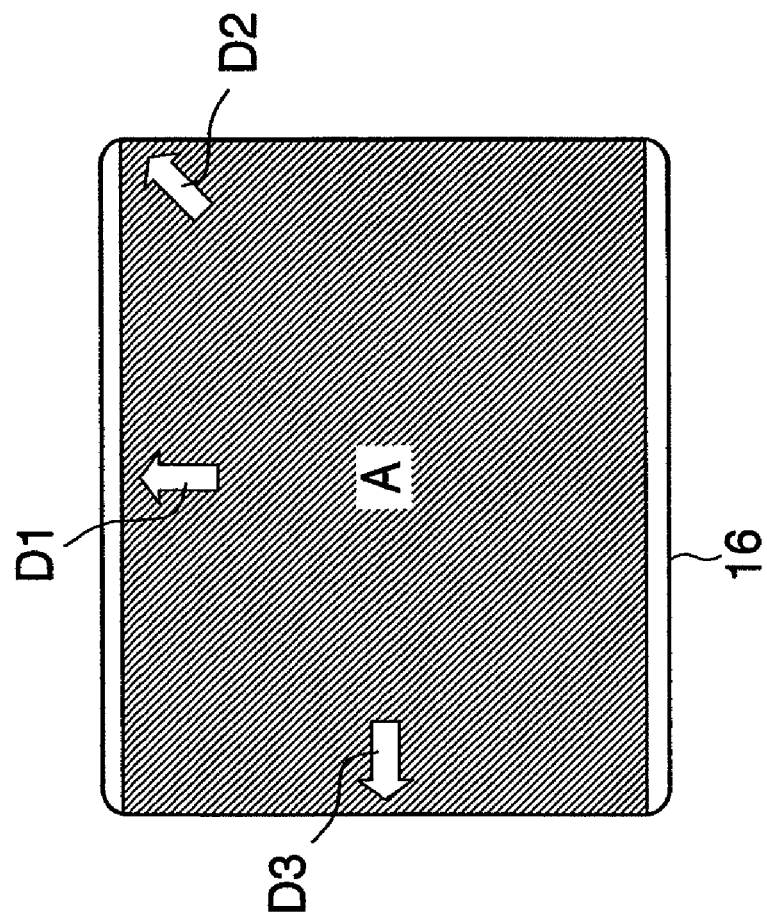
FIG. 15 is one example of symbols indicating the portion of the expanded and displayed synthesized-image and the scrollable direction.

Then, as illustrated in FIG. 15, superposing the icons of arrows D1 to D3 (alternatively, graphics or characters may be used) indicating the directions scrollable in correspondence with the areas A1, A2 and A3 respectively onto the currently expanded and displayed portion A enables the user to easily realize the direction in which the areas can be scrolled.

Alternatively, portions intervened between from the currently displayed portion to the finally scrolled portion may be temporarily displayed at the time of scrolling in the scrollable direction.

Figure 16:
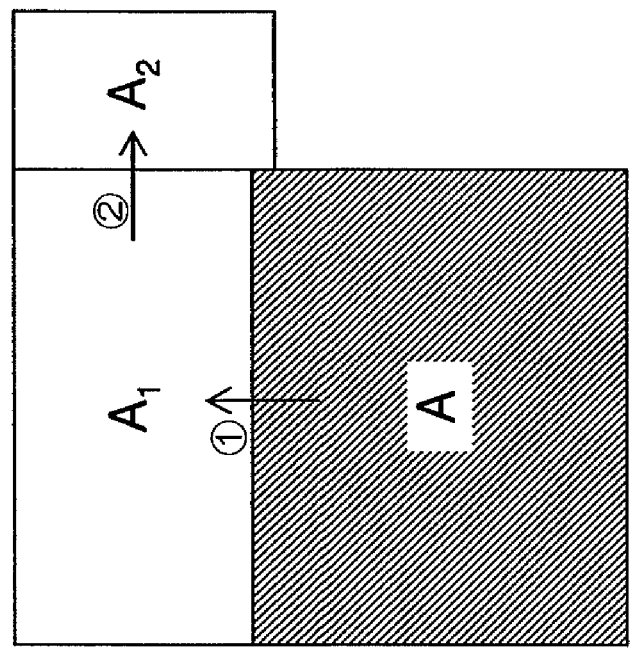
FIG. 16 is a schematic diagram illustrating areas sequentially scrolled from the currently displayed area.

For example, as illustrated in FIG. 16, when a scrolling instruction toward an upper right corner is given on the display of the area A to scroll form the areas A to A2, the scroll moves from the area A to the area A1 intervening therebetween and then to the area A2.

Alternatively, if instruction is issued in the nonscrollable direction, an image zoomed out to an area near the periphery of the area A may be displayed.

For example, as illustrated in FIG. 17A, if a scroll instruction for the right direction in which a scroll cannot be made from the area A is issued, as illustrated in FIG. 17B, the expansion and display of the area A are stopped and an image E0 (an area including the area A and an area near the periphery of a predetermined range of the area A) in which the area A is zoomed out is displayed. At this point, the portion that has been expanded and displayed until now may be indicated by a gray display in the zoomed out image E0.

A zoom out button may be provided on the operating unit 18 to display the zoom out image while the zoom out button is being depressed and to finish displaying the zoom out image to return to the display of an original expansion image when the zoom out button is released from depression.

What is claimed is:

1. An imaging apparatus, comprising:
an imaging unit which picks up an object;
a setting unit which sets a synthesis imaging mode;
an imaging control unit which controls imaging in the imaging unit based on a predetermined sequential shooting interval according to the setting unit setting the synthesis imaging mode;
a storing unit which stores a plurality of image data picked up by the imaging unit at the sequential shooting interval;
an image synthesizing unit which subjects the plurality of image data stored in the storing unit to an image synthesizing process so that duplicated areas between images are superimposed;
a display area setting unit which sets a display area in the synthesized image obtained from the image synthesizing process by the image synthesizing unit;
a display unit which displays the display area set by the display area setting unit;
a record area setting unit which sets a record area based on the display area displayed on the display unit; and
a recording unit which records image data in the record area set by the record area setting unit.

2. An imaging apparatus, comprising:
an imaging unit which picks up an object;
a setting unit which sets a synthesis imaging mode;
an imaging control unit which controls imaging in the imaging unit based on a predetermined sequential shooting interval according to the setting unit setting the synthesis imaging mode;
a storing unit which stores a plurality of image data picked up by the imaging unit at the sequential shooting interval;
an image synthesizing unit which subjects the plurality of image data stored in the storing unit to an image synthesizing process so that duplicated areas between images are superimposed;
a specifying unit which specifies a desired area based on input operation;
a display area setting unit which sets a display area in the synthesized image obtained from the image synthesizing process by the image synthesizing unit based on the area specified by the specifying unit;
a display unit which displays the display area set by the display area setting unit;
a recording area setting unit which sets a recording area based on the display area displayed on the display unit; and
a recording unit which records image data in the recording area set by the recording area setting unit.

3. The imaging apparatus according to claim 1, wherein the display area setting unit includes:
a circumscribed area setting unit which sets an area enclosed by a rectangle circumscribing the synthesized image to the display area; and
a coloration unit which colors a predetermined color to part where a synthesized image does not exist in the display area set by the circumscribed area setting unit.

4. The imaging apparatus according to claim 2, wherein the display area setting unit includes:
a circumscribed area setting unit which sets an area enclosed by a rectangle circumscribing the synthesized image to the display area; and
a coloration unit which colors a predetermined color to part where a synthesized image does not exist in the display area set by the circumscribed area setting unit.

5. The imaging apparatus according to claim 1, wherein the display area setting unit includes:
a temporary display area setting unit which sets a temporary display area;
a temporary setting control unit which controls the temporary display area setting unit to minimize V, where an area of a first area where the synthesized image exists outside the temporary display area set by the temporary display area setting unit is taken as S1, an area of a second area where the synthesized image does not exist inside the temporary display area is taken as S2, a W1 and W2 are taken as a predetermined weighting constant and $V = W1 \times S1 + W2 \times S2$;
a regular setting unit which sets a temporary display area in which the V is minimized to the display area; and
a coloration unit which colors a predetermined color to part where the synthesized image does not exist in the display area set by the regular setting unit.

6. The imaging apparatus according to claim 2, wherein the display area setting unit includes:
a temporary display area setting unit which sets a temporary display area;
a temporary setting control unit which controls the temporary display area setting unit to minimize V, where an area of a first area where the synthesized image exists outside the temporary display area set by the temporary display area setting unit is taken as S1, an area of a second area where the synthesized image does not exist inside the temporary display area is taken as S2, a W1 and W2 are taken as a predetermined weighting constant and $V = W1 \times S1 + W2 \times S2$;
a regular setting unit which sets a temporary display area in which the V is minimized to the display area; and a coloration unit which colors a predetermined color to part where the synthesized image does not exist in the display area set by the regular setting unit.

7. The imaging apparatus according to claim 2, wherein the specifying unit includes a depression detecting unit which detects an operation of depressing a position corresponding to the position where the display area exists, and the display area setting unit sets the display area based on the depressed position detected by the depression detecting unit.

8. The imaging apparatus according to claim 2, wherein the specifying unit includes an input detecting unit which detects inputting operations for specifying the desired area, and the display area setting unit sets the display area based on the inputting operations detected by the input detecting unit.

9. The imaging apparatus according to claim 1, wherein the record area setting unit includes:

a temporary record area setting unit which sets a temporary record area;

an evaluation value calculating unit which calculates an evaluation value related to part where the synthesized image exists in the temporary record area set by the temporary record area setting unit;

a temporary setting control unit which controls the temporary record area setting unit to set the temporary record area so that the evaluated value calculated by the evaluation value calculating unit satisfies a predetermined condition; and a regular setting unit which sets a temporary record area in which the evaluated value is maximized to the record area, and the display unit displays the recording area set by the regular setting unit.

10. The imaging apparatus according to claim 2, wherein the record area setting unit includes:

a temporary record area setting unit which sets a temporary record area;

an evaluation value calculating unit which calculates an evaluation value related to part where the synthesized image exists in the temporary record area set by the temporary record area setting unit;

a temporary setting control unit which controls the temporary record area setting unit to set the temporary record area so that the evaluated value calculated by the evaluation value calculating unit satisfies a predetermined condition; and a regular setting unit which sets a temporary record area in which the evaluated value is maximized to the record area, and the display unit displays the recording area set by the regular setting unit.

11. The imaging apparatus according to claim 1, wherein the record area setting unit includes:

a temporary record area setting unit which sets a temporary record area;

a composition evaluation-value calculating unit which calculates a composition evaluation-value related to the composition of the synthesized image existing in the temporary record area set by the temporary record area setting unit;

a temporary setting control unit which controls the temporary record area setting unit to set the temporary record area in which a composition evaluation-value calculated by the composition evaluation-value calculating unit is maximized; and a regular setting unit which sets a temporary record area in which the composition evaluation-value is maximized to the record area, and the display unit displays the record area set by the regular setting unit.

12. The imaging apparatus according to claim 2, wherein the record area setting unit includes:

a temporary record area setting unit which sets a temporary record area;

a composition evaluation-value calculating unit which calculates a composition evaluation-value related to the composition of the synthesized image existing in the temporary record area set by the temporary record area setting unit;

a temporary setting control unit which controls the temporary record area setting unit to set the temporary record area in which a composition evaluation-value calculated by the composition evaluation-value calculating unit is maximized; and a regular setting unit which sets a temporary record area in which the composition evaluation-value is maximized to the record area, and the display unit displays the record area set by the regular setting unit.

13. The imaging apparatus according to claim 9, wherein the evaluation value calculating unit calculates at least one of the area of the part where the synthesized image exists and an aspect ratio, and the predetermined condition includes at least one of the area being maximized, the aspect ratio being 4:3 and the aspect ratio being 16:9.

14. The imaging apparatus according to claim 1, further comprising:

an expansion display control unit which expands a desired portion of the synthesized image and controls the display unit to display symbols indicating the direction where non-display portion of the synthesized image exists; and a direction specifying unit which specifies a moving direction from the currently expanded displayed portion to a desired non-display portion according to input operations, wherein the expansion display control unit controls the display unit to partially expand and display the synthesized image while scrolling the synthesized image from the currently expanded displayed portion toward a non-display portion existing in the moving direction specified by the direction specifying unit.

15. The imaging apparatus according to claim 2, further comprising:

an expansion display control unit which expands a desired portion of the synthesized image and controls the display unit to display symbols indicating the direction where non-display portion of the synthesized image exists; and a direction specifying unit which specifies a moving direction from the currently expanded displayed portion to a desired non-display portion according to input operations, wherein the expansion display control unit controls the display unit to partially expand and display the synthesized image while scrolling the synthesized image from the currently expanded displayed portion toward a non-display portion existing in the moving direction specified by the direction specifying unit.

16. The imaging apparatus according to claim 14, wherein the expansion display control unit controls the display unit to display a neighboring area including the currently expanded displayed portion according to the direction specifying unit specifying a moving direction which is different from the direction where non-display portion exists and is indicated by the symbol.

17. An imaging method, comprising the steps of:
setting a synthesis imaging mode;
picking up an image based on a predetermined sequential shooting interval according to the synthesis imaging mode being set;
storing a plurality of image data picked up at the sequential shooting interval;
subjecting the stored plurality of image data to an image synthesizing process so that duplicated areas between images are superimposed;
setting a display area in a synthesized image obtained from the image synthesizing process;
displaying the set display area;
setting a record area based on the displayed display area; and
recording image data in the set record area.

18. An imaging method, comprising the steps of:
setting a synthesis imaging mode;
picking up an image based on a predetermined sequential shooting interval according to the synthesis imaging mode being set;
storing a plurality of image data picked up at the sequential shooting interval;
subjecting the stored plurality of image data to an image synthesizing process so that duplicated areas between images are superimposed;
specifying a desired area based on input operation;
setting a display area in a synthesized image obtained from the image synthesizing process based on the specified area;
displaying the set display area;
setting a record area based on the displayed display area; and
recording image data in the set record area.

19. A programmable storage medium tangibly embodying a program of machine-readable instructions executable by a digital processing apparatus to perform an imaging method according to claim 17.

20. A programmable storage medium tangibly embodying a program of machine-readable instructions executable by a digital processing apparatus to perform an imaging method according to claim 18.

* * * * *